United States Patent [19]

Benham

[11] 4,232,950
[45] Nov. 11, 1980

[54] LIQUID CRYSTAL COMPOSITIONS INCLUDING PLEOCHROIC DYE

[75] Inventor: Judith L. Benham, Stillwater, Minn.

[73] Assignee: Minnesota Mining and Manufacturing Company, Saint Paul, Minn.

[21] Appl. No.: 14,541

[22] Filed: Feb. 23, 1979

[51] Int. Cl.³ ............................ C09K 3/34; C02F 1/13
[52] U.S. Cl. .................................. 350/349; 252/299; 252/408; 350/350 R
[58] Field of Search ................ 252/299, 408; 350/346, 350/349, 350 R

[56] References Cited

U.S. PATENT DOCUMENTS

| | | | |
|---|---|---|---|
| 3,833,287 | 9/1974 | Taylor et al. | 252/408 |
| 3,960,750 | 6/1976 | Moriyama et al. | 252/299 |
| 3,960,751 | 6/1976 | Moriyama et al. | 252/299 |
| 4,105,299 | 8/1978 | Huffman et al. | 252/299 |
| 4,128,497 | 12/1978 | Cole, Jr. et al. | 252/299 |
| 4,130,502 | 12/1978 | Eidenschink et al. | 252/299 |
| 4,137,193 | 1/1979 | Osman et al. | 252/299 |
| 4,143,947 | 3/1979 | Aftergut et al. | 252/299 |
| 4,145,114 | 3/1979 | Coates et al. | 252/299 |
| 4,153,343 | 5/1979 | Bloom et al. | 252/299 |
| 4,154,697 | 5/1979 | Eidenschink et al. | 252/299 |

FOREIGN PATENT DOCUMENTS 2815335 10/1978 Fed. Rep. of Germany ........... 252/299
2104 5/1979 European Pat. Off. ................ 252/299

OTHER PUBLICATIONS

Constant, J., et al.; "Photostable Anthraquinone Pleochroic Dyes," presented at 7th Intern'l Liquid Crystal Conf., Bordeaux, France (7/1978).
Bloom, A., et al., Mol. Cryst. Liq. Cryst., vol. 41 (Letters), pp. 1–4 (1977).
Bloom, A. et al., Mol. Cryst. Liq. Cryst., vol. 40, pp. 213–221 (1977).
White, D. L., et al.; J. Appl. Phys., vol. 45, No. 11, pp. 4718–4723 (1974).

*Primary Examiner*—Teddy S. Gron
*Attorney, Agent, or Firm*—Cruzan Alexander; Donald M. Sell; Warren R. Bovee

[57] ABSTRACT

Liquid crystal compositions containing pleochroic dyes. The pleochroic dyes are substituted anthraquinones useful in guest-host combinations with nematic liquid crystal compositions having positive dielectric anisotropy. Electro-optic devices containing these guest-host combinations are employed.

14 Claims, No Drawings

LIQUID CRYSTAL COMPOSITIONS INCLUDING PLEOCHROIC DYE

This invention relates to guest-host combinations of pleochroic dyes in combination with nematic liquid crystal compositions having a net positive dielectric anisotropy. The invention further relates to electro-optical devices employing these guest-host combinations.

Electro-optical devices in which liquid crystals are employed usually comprise two spaced, transparent flat plates having very thin transparent electrodes on their inwardly facing surfaces and sealed at their periphery to form a closed cell. The space between the plates is filled with a liquid crystalline composition. Impressing an electrical field on the liquid crystal affects the optical properties of the layer of liquid crystal.

It was discovered by Heilmeier and Zanoni, *Applied Physics Letters*, Vol. 13, pages 91–92 (1968), that when pleochroic dyes are combined with nematic liquid crystals in a display device such as described above, the pleochroic character of the dye is manifested when an electric field is applied and released. That is, the display device may appear to change color or go from clear to colored as the electric field is applied and released and the orientation of the pleochroic dye is altered. The nematic liquid crystal material is commonly referred to as the "host" and the pleochroic dye as the "guest" so that the combination is referred to as a guest-host combination. It is believed that the molecules of the pleochroic material dissolved in the host mixture are ordered by the liquid crystal material thereby forming a cooperatively aligned guest-host system. When the liquid crystal host is oriented or reoriented by the intermittent application of an electric field, the orientation of the pleochroic dye guest is also changed by the movement of the host molecules. The phenomenon has been described in a number of U.S. Patents. See for example U.S. Pat. Nos. 3,551,026; 3,597,044; 3,960,751; 3,551,026 and 3,597,044.

Many pleochroic dyes which are useful in guest-host combinations tend to be elongated molecules exhibiting little or no absorption of light vibrating parallel to the long axis while absorbing that light in various portions of the visible spectrum which vibrates parallel to the short axis. Other pleochroic dyes may align oppositely being colorless (non-absorbing) with respect to light vibrating along the short axis of the molecule and colored (absorbing) with respect to light vibrating parallel to the long axis.

By combining two pleochroic dyes, one each of the above two types, devices which change from one color to another are evidently possible. A further effect is obtained by incorporating an isotropic, i.e., non-pleochroic, dyestuff with a pleochroic dyestuff so that the colors of the two are additive at one stage and the isotropic dyestuff appears at the other stage of cycling the electric field.

In order that there be a cycle between colorless and colored or between two colors for a given device it is desirable to employ the dye in amounts which are soluble in the nematic liquid crystal, and not in excess of the proportions which are within the capabilities of alignment by the amount of liquid crystal present. Generally the pleochroic dyes can be effective in various liquid crystal compositions in amounts up to about 25% by weight based on the total weight of the guest-host combination. In some cases the solubility of the pleochroic dye in the liquid crystal is inadequate to achieve concentrations above about 5% By weight. Many guest-host combinations of the prior art are capable of achieving contrasts from zero to maximum electric field of about 2:1 up to about 4:1.

It has been generally taught in the prior art that for a dye to be useful in liquid crystal displays it must exhibit favorable parameters with respect to pleochroism, order parameter and solubility in the liquid crystal composition. The structural properties of pleochroic dye molecules exhibiting such favorable parameters have tended to resemble those of the host liquid crystal molecules. Thus, long, rod-shaped easily polarizable molecules, bulky ballasting groups and linearity of the dye molecule have been assumed to be important criteria. Examples of such dyes are found in the patent literature U.S. Pat. Nos. 3,703,329; 3,833,287; 3,960,751 and 4,032,219. Other publications describing such dyes are: Constant, J. et al, "Pleochroic dyes of high optical order parameter" presented at the 6th International Liquid Crystal Conference, Kent Ohio (August 1976), and White, D.C. et al. *J. Applied Physics*, Volume 45, No. 11, pp 4718–4723 (1974).

In accordance with the present invention it has been found that a particularly useful and desirable class of colored compounds exhibit a strong pleochroism, high solubility in common positive nematic liquid crystal compositions, high optical order parameters and excellent chemical stability in combination with liquid crystal materials. This very useful group of pleochroic compounds are substituted anthraquinones represented by the general formula:

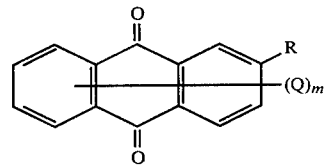

Wherein:
Q represents independently $-NH_2$, $-NO_2$, $-OH$, $-Cl$ or $-F$,
m is an integer from 1 to 4, and
R represents $-CH_3$, $-OCH_3$ or $-H$ While compounds having the formula shown above are colored compounds and are commercially used as intermediates in the synthesis of more complex anthraquinone dyes, it is quite surprising tha these compounds exhibit excellent pleochroic properties in guest-host combinations since these dyes not not possess the structural properties previously thought necessary to impart the advantageous properties of the previously known useful pleochroic dyes. Accordingly, these pleochroic dyes have surprisingly broad absorption bands in the visible region, e.g. about 400 to 650 nanometers. The high extinction coefficients exhibited by these compounds coupled with the broad absorption bands provide enhanced perceived visual contrast ratios. For example, liquid crystal compositions having a net positive dielectric anisotropy and containing the guest pleochroic dyes of this invention commonly provide a contrast ratio of about 10 to 1 or greater as measured spectrophotometrically.

The anthraquinone dyes of the present invention are commercially available and can be readily synthesized by techniques well known in the art. For example, the compounds of the present invention can be prepared via the synthesis of the desired o-benzoylbenzoic acids from a phthalic anhydride and a substituted benzene using aluminum chloride. Ring closure is accomplished using sulfuric acid or oleum. The reaction can be illustrated as follows:

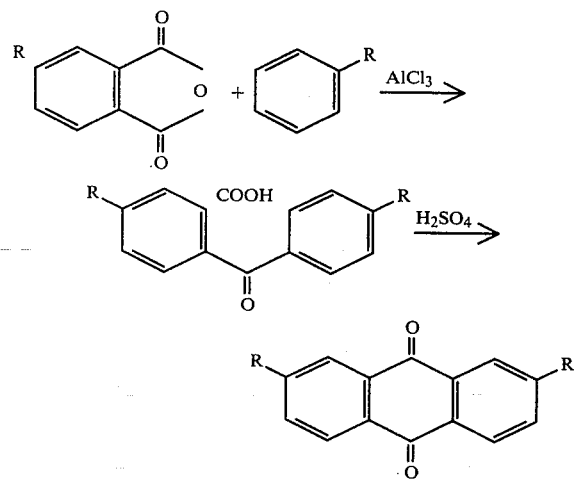

Several other rearrangements and condensation techniques may be used to arrive at the appropriate o-benzoylbenzoic acid. Reference is made to British Patent 334166, Gleason and Dougherty, *J. Am. Chem. Soc.* 51, 310 (1929) IG Farbenindustrie, Bios Reports 987, Marschalk, *Bull. Soc. Chim. France*, [5]2, 1810 (1935). Other species may be prepared via direct halogenation, elimination reactions, hydrolysis of haloanthraquinone, nitration of appropriate anthraquinone derivitives etc. Many examples are known in the art and may be found in such works as Lubs, H.A. "The Chemistry of Synthetic Dyes and Pigments" Reinhold Publishing Company.

Depending on the synthesis route employed or the commercial source for the dyes it may be preferable to purify these pleochroic dyes prior to their use in a guest-host display. This is due to the presence of unwanted side reaction products, ionic salts and other contaminants which may degrade or otherwise interfere with the performance of the guest-host liquid crystal mixture.

Standard methods of purification may be employed including precipitation from sulfuric acid, crystallization from nonionic solvents and separation by chromatographic techniques. Vacuum sublimation techniques can also be employed to effect purification. A purification method which has been found useful is the use of liquid chromatography using alumina and elution with toluene/methanol and toluene/methanol/acetic acid. The collected fraction of the particular dye is subsequently evaporated to dryness and dried in a vacuum chamber for about 12–24 hours.

The substituted anthraquinones of the general formula shown herein are found to form particularly useful guest-host combinations with the commonly used nematic liquid crystal compounds having positive dielectric anisotropy or compositions including positive anisotropic compounds in dominating amounts, i.e. providing net positive dielectric anisotropy. Positive anisotropy as used herein includes compositions having net positive dielectric anisotropy.

Pleochroic dye compounds of the invention can be employed alone, and with each other and with other dyes, in guest-host combinations in a wide range of effective amounts with the nematic liquid crystal compositions. Generally, the upper limit of the effective amount is a function of the solubility of the pleochroic dye in the liquid crystal. The pleochroic dyes of the present invention can be effectively used in concentrations of up to about 25% by weight of the total guest-host combination. For liquid crystal displays providing informational content it is generally desired to maintain the background color, i.e., the color in the "clear" state, at a minimum. Accordingly, for these displays the pleochroic dyes are generally used in amounts ranging from about 0.5 to 5% by weight, preferably about 0.5 to 1.5% by weight.

Typical liquid crystal compounds exhibiting positive anisotropy and useful with the pleochroic dyes described herein are trans-4-n-pentyl-(4'-cyanophenyl)-cyclohexane, trans-4-n-pentyl-(4'-cyanobiphenyl)-4)-cyclohexane, p-n-hexylbenzylidene-p'-aminobenzonitrile, p-methoxybenzyldiene-p'-amino-benzonitrile, p-ethoxybenzylidene-p'-aminobenzonitrile, p-cyanobenzylidene-p'-n-butyoxyaniline, p-cyanobenzyl-idene-p'-octyloxyaniline, and compounds having the formula

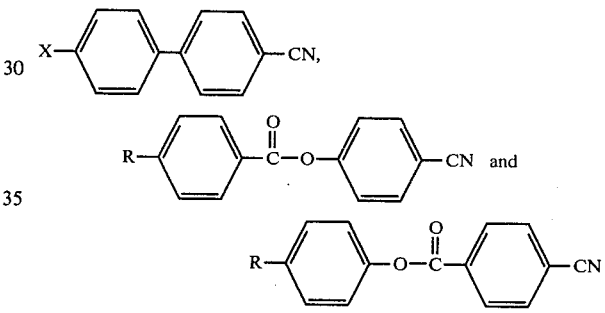

wherein R=alkyl or alkoxy of 1–7 carbon atoms and X is alkyl or alkoxy of 1–10 carbon atoms.

Eutectic mixtures and combinations of all the above are also useful. Illustrative eutectic mixtures of 4'-substituted 4-cyanobiphenyls wherein the 4' substituents are alkyl or alkoxy of 3 to 8 carbon atoms. Representative is the commercially available "E-7" mixture from B.D.H. Ltd. Yet another useful mixture of compounds comprises mixtures of the phenylcyclohexanes referred to above such as mixtures comprising the 4-alkyl-(4'-cyanophenyl)cyclohexanes, mixtures comprising 4-alkyl-(4'-cyanobiphenylyl)cyclohexanes, and mixtures comprising both types of compounds. One useful commercial mixture is a four-component mixture available from EM Laboratories, Inc., identified as Nematic Phase 1132 TNC "Licristal". This mixture comprises by weight approximately: 14% trans-4-n-pehtyl-(4'-cyanobiphenylyl) cyclohexane, 26% trans-4-n-propyl-(4'-cyanophenyl)cyclo-hexane, 36% trans-4-n-pentyl(4'-cyanophenyl)cyclohexane, and 24% trans-4-n-heptyl-(4'-cyanophenyl)cyclohexane.

Useful groups of nematic liquid crystal compounds and compositions having negative anisotropy are represented by the following groups of compounds: p-methoxybenzylidene-p'-n-butylaniline, p-methoxybenzylidene-p'-amino-phenylbenzoate, p-methoxybenzylidene-p'-amino-phenylacetate, p-azoxyanisole, p-n-butylbenzoic acid p'-n-hexyloxyphenyl ester, p(p'- ethoxyphenylazo)phenyl heptanoate, p(p'-ethoxyphenylazo)phenyl undecylenate, p-butyoxy benzylidene-p'-pentylaniline, and p-ethoxybenzylidene-p'-n-butylaniline are contemplated as well as groups of compounds such as

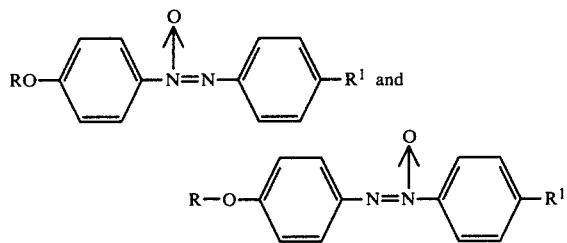

wherein R and R$^1$ are lower alkyl of C$_1$-C$_4$;

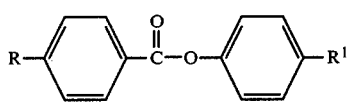

wherein R is alkyl of C$_1$-C$_7$ and R$^1$ is alkoxy of C$_1$-C$_7$ or wherein R is alkoxy of C$_1$-C$_7$ and R$^1$ is alkyl C$_1$-C$_7$;

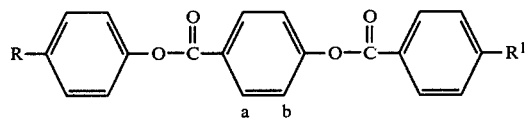

wherein R and R$^1$ are alkyl of C$_1$-C$_7$ and a or b are H or one can be Cl.

Certain of the negative nematic liquid crystalline compounds described above are described above in U.S. Pat. Re No. 29,349, 3,829,491, 3,809,656, 3,994,567 and 3,703,331. When the negative nematic compounds are combined with the positive nematic compounds, combinations can be provided which have a net positive anisotropy. This may be achieved using only relatively low percentages of materials with high positive anisotropy when the other materials have relatively low negative anisotropy.

As noted hereinabove, the pleochroic anthraquinone dyes described herein can be used to provide electro-optic displays, such as liquid crystal displays. The pleochroic dyes can be incorporated in a guest-host relation in combination with liquid crystal compounds or compositions having positive dielectric anisotropy. This is accomplished by mixing the pleochroic dye and liquid crystal and filling a conventional display cell with the mixture using techniques known in the art. For example, the twist nematic, field effect displays can be made such as are described in U.S. Pat. No. 3,918,796 issued Nov. 11, 1975. Additionally, other displays employing positive liquid crystal compounds can utilize the pleochroic dye compounds of the present invention, such as the devices described in U.S. Pat. No. 3,703,329; 3,833,287; 3,960,751 and 4,032,219. Of particular interest are the display devices employing the well-known cholesteric-nematic phase change device wherein the guest-host mixture includes a proportion, for example, up to about 50% by weight, of a chiral or optically active cholesteric liquid crystal, such as cholesteryl nonanoate, resulting in absorption of all planes of light by the guest pleochroic dye eliminating any need for an external polarizing element.

The unusual properties of the instant pleochroic dyestuffs render them of value in combinations with nematic liquid crystals in dislay devices as for calculators, watches, etc. and also for use as electronic shutters for devices such as cameras and projectors and by use in a specular arrangement they assist in providing mirrors which can pass from specular to transparent and can be employed in cameras or wherever mirrors are used.

The substituted anthraquinone compounds described herein are further remarkable in providing exceptionally high values of the optical order parameter S. This parameter is a measure of the efficiency of orientation of a dye. It is determined by measuring absorption of polarized light as the log of the reciprocal of percent transmission, at the wavelength and incident angle of maximum absorption, through a liquid crystal solution of the dye in a liquid crystal cell as described above with and without an impressed orienting electrical field. Where A$_1$ and A$_0$ are the absorption with and without field respectively, $$S = \frac{A_0 - A_1}{A_0 + 2A_1}$$

The parameter S is given as a decimal number less than 1. For a given dye it may vary somewhat depending on the particular nematic liquid crystal employed as host. Many of the the Pleochroic dyes previously known provided values of S of the order of about 0.3 to 0.5. The pleochroic dyes employed in the present invention provide optical order parameters of 0.5 and higher and with preferred compounds, parameters of 0.7 and higher can be achieved. This is a very high range of values not to be expected from compounds having the structure of the pleochroic dyes described herein.

Guest host combinations according to the present invention also provide very high contrast ratios as a result of the high order parameters of the pleochroic dyes described herein. Contrast ratios of 10 to 1 and even higher can readily be achieved using the guest-host combinations of the present invention.

As used herein, the contrast ratio for a transmissive display is the difference in optical density between the on and off state of the display measured at 25° C. employing the visible portion of the spectrum where maximum absorption occurs. For a reflective display, the contrast ratio is generally measured using a collimated light source at an angle 20° incident and viewed at a normal viewing angle.

The following examples are illustrative of various aspects of the present invention.

EXAMPLES 1-13

Substituted anthraquinone dyes according to the present invention were purified and mixed at a level of 1% by weight in a positive nematic liquid crystal composition comprising a mixture of three cyanophenylcyclohexanes and one cyanobiphenylylcyclohexane (available commercially under the trade designation Nematic Phase 1132 TNC Licristal from E.M. Laboratories, Inc.) to which 1% by weight of cholesteryl nonanoate was added. The values to calculate the optical order parameter, S, were determined in a spectrophotometer as described previously herein. The results are reported in the table below.

| Example | Anthraquinone Ring Position | | | | | | | | Wave-Length, nm | S |
|---|---|---|---|---|---|---|---|---|---|---|
| | 1 | 2 | 3 | 4 | 5 | 6 | 7 | 8 | | |
| 1 | NH$_2$ | — | — | — | Cl | — | — | — | 510 | 0.62 |
| 2 | NH$_2$ | — | — | — | — | Cl | Cl | — | 520 | 0.62 |
| 3 | NH$_2$ | — | OH | — | — | — | — | — | 530 | 0.70 |
| 4 | NH$_2$ | CH$_3$ | — | OH | — | — | — | — | 540 | 0.68 |
| 5 | NH$_2$ | — | — | NH$_2$ | — | — | — | — | 540 | 0.68 |
| 6 | NH$_2$ | — | — | NH$_2$ | NH$_2$ | — | — | NH$_2$ | 600 | 0.65 |
| 7 | NH$_2$ | — | — | NH$_2$ | NO$_2$ | — | — | — | 620 | 0.71 |
| 8 | NH$_2$ | — | — | NO$_2$ | NO$_2$ | — | — | NO$_2$ | 625 | 0.70 |
| 9 | NH$_2$ | CH$_3$ | — | NH$_2$ | — | — | — | — | 550 | 0.68 |
| 10 | NO$_2$ | CH$_3$ | — | — | — | — | — | — | 450 | 0.60 |
| 11 | NH$_2$ | OCH$_3$ | Cl | NH$_2$ | — | — | — | — | 600 | 0.65 |
| 12 | Cl | — | — | — | Cl | — | — | — | 415 | 0.56 |
| 13 | Cl | — | — | — | — | — | — | Cl | 415 | 0.50 |

What is claimed is:

1. A composition having positive dielectric anisotropy comprising at least one nematic liquid crystal material having positive dielectric anisotropy and a pleochroic dye in an amount effective to provide a pleochroic character having the general formula:

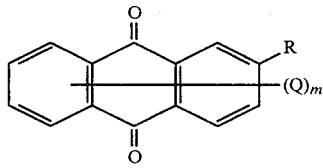

wherein
Q is independently —NH$_2$, —NO$_2$, —OH, —Cl or —F;
R is —CH$_3$, —OCH$_3$ or —H; and
m is an integer from 1 to 4.

2. A composition according to claim 1 wherein the pleochroic dye compound is selected from the group consisting of 1,4-diaminoanthraquinone; 1,4-diamino-5-nitro-anthraquinone; 1-amino-4-hydroxyanthraquinone; 1-amino-5-chloroanthraquinone; and mixtures thereof.

3. A composition according to claim 1 wherein the nematic liquid crystal composition comprises 4-alkyl-(4'-cyanophenyl)cyclohexane and 4-alkyl-(4'-cyanobiphenylyl)cyclohexane.

4. A composition according to claim 1 wherein the nematic liquid crystal comprises a eutectic mixture of 4'-substituted 4-cyanobiphenyls wherein the 4' substituents are selected from the group consisting of alkyl and alkoxy having of 3 to 8 carbon atoms.

5. A composition according to claim 1 wherein said pleochroic dye is present in amounts of about 0.5% to 5.0% by weight of the total composition.

6. A composition according to claim 1 additionally containing up to about 50% by weight of a chiral agent.

7. A composition according to claim 6 wherein said chiral agent is cholesteryl nonanoate.

8. An electro-optic device comprising a transparent envelope having electrodes on a portion of the opposed surfaces thereof and containing in said envelope a nematic liquid crystal composition having a pleochroic dye dissolved therein in an amount effective to provide a pleochroic character, wherein the improvement comprises a liquid crystal composition comprising at least one nematic liquid crystal material having positive dielectric anisotropy and a pleochroic dye compound having the general formula:

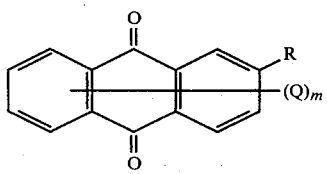

wherein
Q is independently —NH$_2$, —NO$_2$, —OH, —Cl or —F;
R is —CH$_3$, —OCH$_3$ or —H; and
m is an integer from 1 to 4.

9. An electro-optical device according to claim 8 wherein the pleochroic dye compound is selected from the group consisting of 1,4-diaminoanthraquinone; 1,4-diamino-5-nitroanthraquinine; 1-amino-4-hydroxyanthraquinone; 1-amino-5-chloroanthraquinone; and mixtures thereof.

10. A device according to claim 8 wherein the nematic liquid crystal composition comprises 4-alkyl-(4'-cyanophenyl)cyclohexane and 4-alkyl-(4'-cyanobiphenylyl)cyclohexane.

11. A device according to claim 8 wherein the nematic liquid crystal comprises a eutectic mixture of 4'-substituted 4-cyanobiphenyls wherein the 4'substituents are selected from the group consisting of alkyl and alkoxy having 3 to 8 carbon atoms.

12. A device according to claim 8 wherein said pleochroic dye is present in amounts of about 0.5% to 5.0% by weight of the total composition.

13. A device according to claim 8 wherein said liquid crystal composition additionally contains up to about 50% by weight of a chiral agent.

14. A device according to claim 13 wherein said chiral agent is cholesteryl nonanoate.